(12) United States Patent
Baskaran et al.

(10) Patent No.: US 10,317,865 B2
(45) Date of Patent: Jun. 11, 2019

(54) METHOD AND SYSTEM FOR DETERMINING POTENTIAL ENERGY SAVING FOR A MULTISITE ENTERPRISE

(71) Applicant: CARRIER CORPORATION, Jupiter, FL (US)

(72) Inventors: Deepak Baskaran, Tiruchirappalli (IN); Subhasis Mandal, Bangalore (IN); Prabhu Raja Subbarayalu Venkitapathi, Coimbatore (IN)

(73) Assignee: CARRIER CORPORATION, Jupiter, FL (US)

( * ) Notice: Subject to any disclaimer, the term of this patent is extended or adjusted under 35 U.S.C. 154(b) by 419 days.

(21) Appl. No.: 15/178,845

(22) Filed: Jun. 10, 2016

(65) Prior Publication Data

US 2017/0343974 A1    Nov. 30, 2017

(30) Foreign Application Priority Data

May 25, 2016   (IN) .............................. 201641017918

(51) Int. Cl.
*G05B 19/042*   (2006.01)

(52) U.S. Cl.
CPC .. *G05B 19/0423* (2013.01); *G05B 2219/2639* (2013.01)

(58) Field of Classification Search
CPC ........ G05B 19/0423; G05B 2219/2639; G05B 15/02; G05B 700/22; G05B 700/286–700/298
See application file for complete search history.

(56) References Cited

U.S. PATENT DOCUMENTS

| | | | |
|---|---|---|---|
| 9,691,076 B2 * | 6/2017 | McCurnin | G06Q 30/0202 |
| 2003/0171851 A1 | 9/2003 | Brickfield et al. | |
| 2011/0231320 A1 | 9/2011 | Irving | |
| 2013/0024029 A1 | 1/2013 | Tran et al. | |

* cited by examiner

*Primary Examiner* — Robert E Fennema
*Assistant Examiner* — Marzia T Monty
(74) *Attorney, Agent, or Firm* — Cantor Colburn LLP

(57) ABSTRACT

The present disclosure relates to a method and system for determining potential energy savings for a multisite enterprise by an energy evaluation system. The energy evaluation system receives energy consumption data and plurality of variables associated with plurality of sites and identifies a category for the plurality of variables based on a relationship of the plurality of variables with the energy consumption data. The energy evaluation system further determines one or more significant variables based on an impact of the plurality of variables on the energy consumption data and category of the plurality of variables. The energy evaluation system identifies a plurality of clusters for the multisite enterprise based on the one or more significant variables, evaluates the plurality of clusters of variables and optimizes the plurality of clusters of the plurality of variables based on the evaluation. Based on the evaluation and optimization a potential energy savings is determined.

25 Claims, 6 Drawing Sheets

METHOD AND SYSTEM FOR DETERMINING POTENTIAL ENERGY SAVING FOR A MULTISITE ENTERPRISE

FIELD OF THE INVENTION

The present subject matter is related in general to energy management, more particularly, but not exclusively to, a method and a system for determining potential energy saving for a multisite enterprise.

BACKGROUND

With the tremendous increase in the number of enterprises and organizations across the world, management of the energy consumption and optimizing its usage has become one of the major concerns. The enterprises in the present scenario have various facilities which require energy across various locations. The ever increasing consumption of energy in the commercial front has stimulated for a keen focus on energy management and savings. Energy efficiency offers the largest and most cost-effective opportunity for both industrialized and developing nations to limit the enormous financial, health and environmental costs associated with energy consumption. Thus, this necessitates for an efficient and effective approach for evaluation of the energy savings.

The organizations with multiple sites across different locations have multiple facilities which consume energy. The multiple sites with various facilities posses different characteristics pertaining to size, geography, weather conditions, operating hours, type of equipment, operating conditions, instrumentation used etc. In addition to this, the adherence to policies across the different sites may not be uniform. These sites with different characteristics and inconsistent adherence to policies cause problem in identifying the energy inefficiencies.

Thus in the existing technique, the multiple sites containing different characteristics and inconsistent adherence to policies makes the identification and addressing of the energy inefficiencies a very difficult proposition. The identification and tracking of the inefficiencies at the individual sites also incurs huge cost. Thus, there is a need for an effective method for determining the potential energy savings for the organization with multiple sites.

SUMMARY

In an embodiment, the present disclosure relates to a method for determining potential energy savings for a multisite enterprise. The method comprises receiving energy consumption data and plurality of variables associated with plurality of sites of an enterprise from one or more data sources, identifying a category for the plurality of variables based on a relationship of the plurality of variables with the energy consumption data, determining one or more significant variables based on an impact of the plurality of variables on the energy consumption data and the category of the plurality of variables, identifying a plurality of clusters for a multisite enterprise based on the one or more significant variables, evaluating the plurality of clusters for the multisite enterprise, optimizing the plurality of clusters based on the evaluation and determining values indicative of potential energy savings for the multisite enterprise based on the evaluation and optimization of the plurality of clusters.

In an embodiment, the present disclosure relates to an energy evaluation system for determining the potential energy savings for a multisite enterprise. The energy evaluation system comprises a processor and a memory communicatively coupled to the processor, wherein the memory stores processor executable instructions, which, on execution, causes the energy evaluation system to receive energy consumption data and plurality of variables associated with plurality of sites of an enterprise from one or more data sources, identify a category for the plurality of variables based on a relationship of the plurality of variables with the energy consumption data, determine one or more significant variables based on an impact of the plurality of variables on the energy consumption data and the category of the plurality of variables, identify a plurality of clusters for the multisite enterprise based on the one or more significant variables, evaluate the plurality of clusters for the multisite enterprise, optimize the plurality of clusters based on the evaluation and determine values indicative of potential energy savings for the multisite enterprise based on the evaluation and optimization of the plurality of clusters.

In an embodiment, the present disclosure relates to a non-transitory computer readable medium including instructions stored thereon that when processed by at least one processor cause an energy evaluation system to receive energy consumption data and plurality of variables associated with plurality of sites of an enterprise from one or more data sources, identify a category for the plurality of variables based on a relationship of the plurality of variables with the energy consumption data, determine one or more significant variables based on an impact of the plurality of variables on the energy consumption data and the category of the plurality of variables, identify a plurality of clusters of the plurality of variables based on the one or more significant variables, evaluate the plurality of clusters for the multisite enterprise, optimize the plurality of clusters based on the evaluation and determine values indicative of potential energy savings for the multisite enterprise based on the evaluation and optimization of the plurality of clusters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
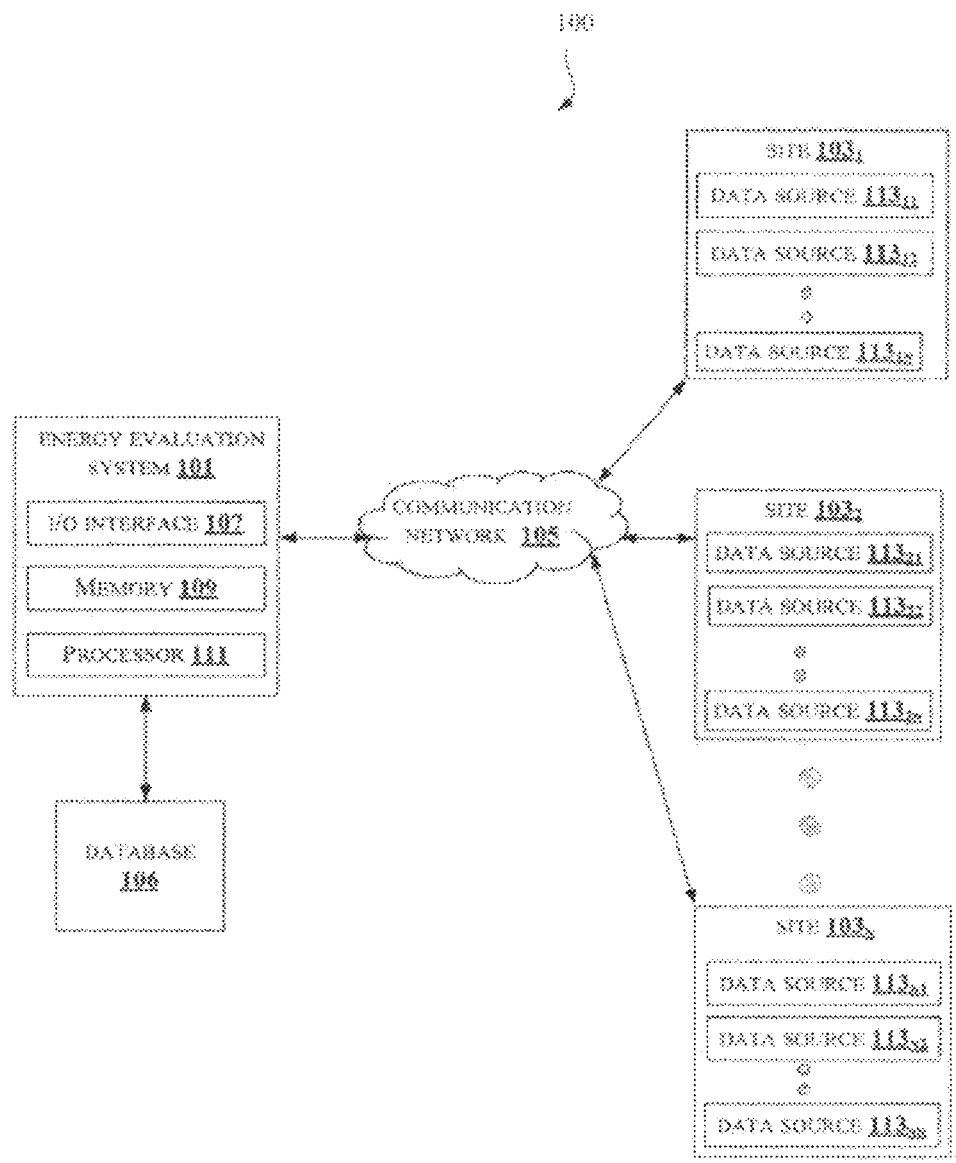
FIG. 1 shows an exemplary environment for determining potential energy savings for a multisite enterprise in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for determining potential energy savings for a multisite enterprise. The present disclosure provides an energy evaluation system which determines the potential energy savings for the multisite enterprise by categorizing a plurality of variables associated with a plurality of sites of the enterprise based on a relationship with the energy consumption data received. The plurality of variables associated with the multisite enterprise comprises information about one or more facilities present in the plurality of sites of an enterprise. In an embodiment, the facilities associated with the plurality of sites comprise one or more equipment which consumes energy. The present disclosure discloses identifying one or more significant variables which show a significant relationship with the energy consumption data. The present disclosure identifies a plurality of clusters for the multisite enterprise which are then evaluated to determine the potential energy savings for the multisite enterprise. In an embodiment, the potential energy savings is calculated for each of the facilities used at the sites and also for the multisite enterprise as a whole. In such a way, potential energy savings for the multisite enterprise is determined which helps in automatic and remote identification of energy optimization scope at the multiple sites of the enterprise.

FIG. 1 shows an exemplary environment for determining potential energy savings for a multisite enterprise in accordance with some embodiments of the present disclosure.

As shown in FIG. 1, the environment 100 comprises an energy evaluation system 101, a site $103_1$, site $103_2$, ..., site $103_N$ (collectively called plurality of sites 103). The energy evaluation system 101 is connected to the plurality of sites 103 through a wired or wireless communication network 105. The site $103_1$ comprises a data source $113_{11}$, data source $113_{12}$, ..., data source $113_{1n}$. In an embodiment, the other plurality of sites 103 also comprises data sources as shown in FIG. 1. The data sources of the plurality of sites 103 are collectively referred as data sources 113. The energy evaluation system 101 is connected to a database 106. The database 106 comprises energy consumption data and plurality of variables received from the data sources 113, categories of the variables, plurality of clusters of variables and potential energy savings identified. In an embodiment, clustering is a technique for identifying similar set of facilities in a data set with similar characteristics. The energy evaluation system 101 determines the potential energy savings for the multisite enterprise based on the evaluation of the plurality of clusters of the multisite enterprise. The energy evaluation system 101 receives the energy consumption data and plurality of variables from the data sources 113 of the plurality of sites 103. In an embodiment, the energy consumption data and plurality of variables may be in the downloadable form from the web portal of the plurality of sites of the enterprise or can be received in the form of spread-sheet or any other document format from the plurality of sites 103. The data sources 113 may comprise for example energy management platforms present in the enterprises. A person skilled in the art would understand that any other platforms can be used for the data sources 113. Further, the data sources 113 receive the energy consumption data and the plurality of variables from in-site instrumentation present in each site as shown in FIG. 2b. In an embodiment, the in-site instrumentation is present in the plurality of sites 103 and is collectively referred as 103A. In an embodiment, the in-site instrumentations may include, but are not limited to, occupancy sensors, timer control sensors, temperature sensors, energy meters etc. In an embodiment, the plurality of variables associated with the plurality of sites 103 of the enterprise may include, but are not limited to, size information, weather condition, operating hours of the multiple sites, type of equipment, age of equipment, operating condition of equipment, instrumentation and controls used at the multiple sites of the enterprise. In an embodiment, the plurality of sites 103 may also comprise data from one or more user devices (not shown in figure), such as information on the various equipment, location information etc. The plurality of variables received from the data sources 113 are categorized based on the relationship they hold with the energy consumption data. In an embodiment, the relationship between the plurality of variables and the energy consumption data is defined. The energy evaluation system 101 further identifies one or more significant variables which have significant relationship with the energy consumption data at a pre-defined significance level. In an embodiment, the significance level is set based on the business context and varies from one enterprise to another. The significance level is further adjusted later on based on the feedbacks generated after evaluating the potential energy savings. Further, the energy evaluation system 101 identifies a plurality of clusters of facilities for the multisite enterprise which are evaluated to determine the potential energy savings for the multisite enterprise. The energy evaluation system 101 further optimizes the plurality of clusters based on factors of the evaluation. Further, the energy evaluation system 101 determines the potential energy savings for the multisite enterprise based on the optimization and evaluation of the plurality of clusters.

The energy evaluation system 101 comprises an I/O interface 107, a memory 109 and a processor 111. The I/O interface 107 is configured to receive the energy consumption data and plurality of variables associated with the plurality of sites 103 of the enterprise.

The received information from the I/O interface 107 is stored in the memory 109. The memory 109 is communicatively coupled to the processor 111 of the energy evaluation system 101. The memory 109 also stores processor instructions which cause the processor 111 to execute the instruction in order to determine potential energy savings for the multisite enterprise.

Figure 2A:
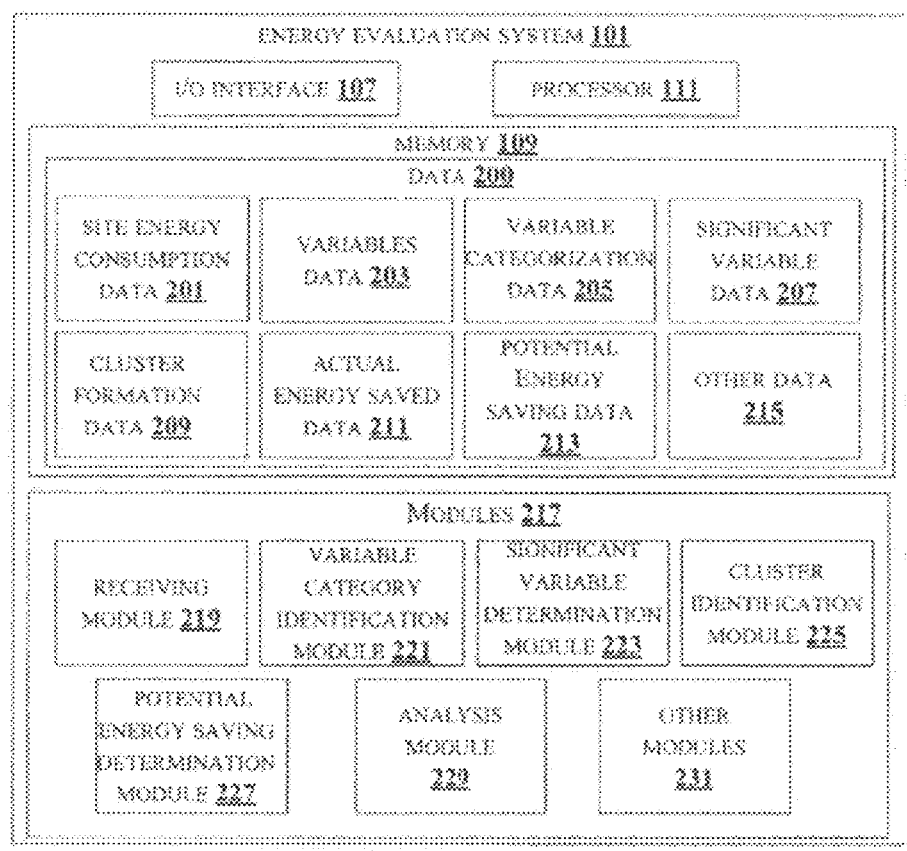
FIG. 2a shows a detailed block diagram illustrating an energy evaluation system in accordance with some embodiments of the present disclosure.
Figure 2B:
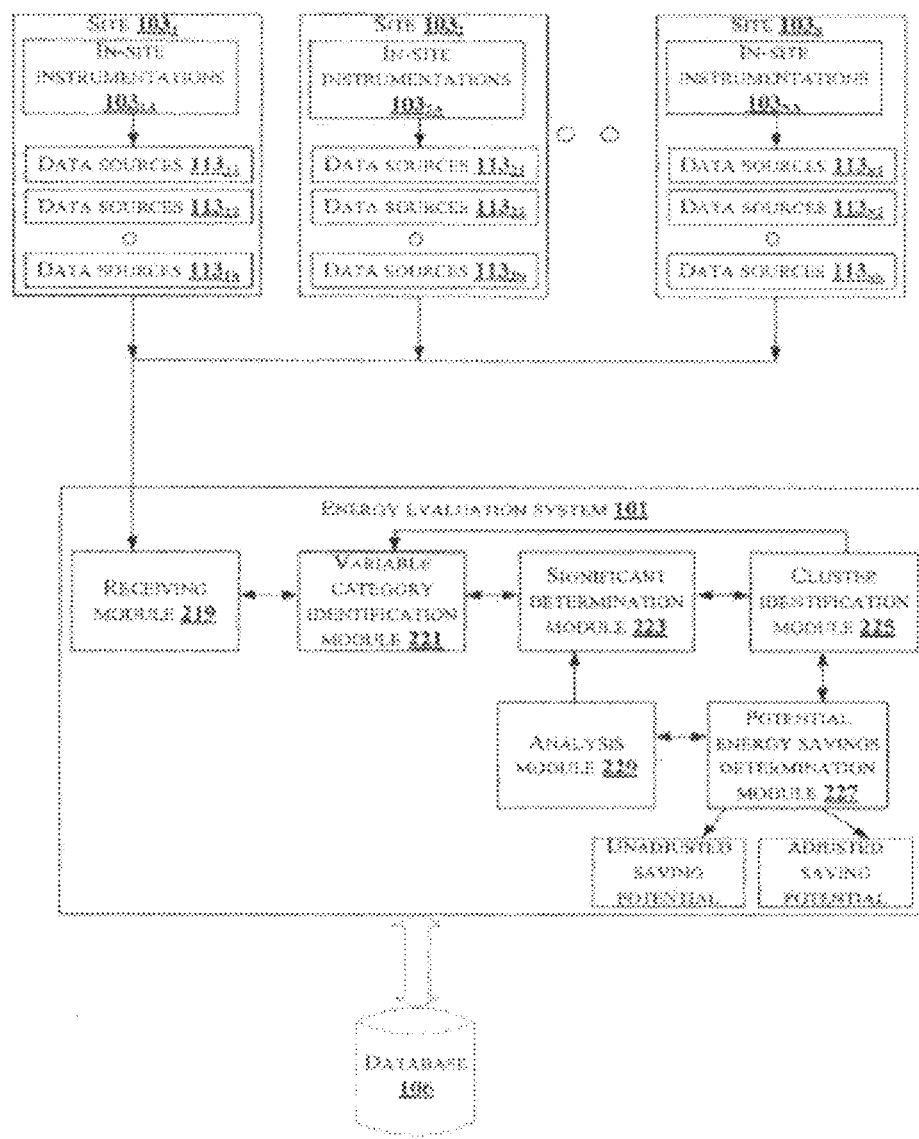
FIG. 2b shows an exemplary environment illustrating data flow between different modules of the energy evaluation system in accordance with some embodiment of the present disclosure.

FIG. 2a shows a detailed block diagram illustrating an energy evaluation system in accordance with some embodiments of the present disclosure.

One or more data 200 and one or more modules 217 of the energy evaluation system 101 are described herein in detail. In an embodiment, the one or more data 200 comprises site energy consumption data 201, variable data 203, variable categorization data 205, significant variable data 207, cluster formation data 209, actual energy saving data 211, potential energy saving data 213 and other data 215 for determining the potential energy savings for a multisite enterprise.

The site energy consumption data 201 comprises data associated with the consumption of energy at the plurality of sites 103 of the enterprise. The site energy consumption data 201 is received from data sources 113 present at the plurality of sites 103 of the enterprise. The data sources 113 may comprise, for example, energy management platforms. The site energy consumption data comprises data regarding the consumption of energy by the various facilities of the plurality of sites 103.

The variable data 203 comprises information about the size information, weather conditions, and operating hours of the multiple sites, type of equipment, age of equipment, operating condition of equipment, instrumentation and controls used at the plurality of sites 103 of the multisite enterprise. The variable data 203 is gathered from the available data sources 113 of the plurality of sites 103.

The variable categorization data 205 comprises information about the category identified for the plurality of variables received from the data sources 113. The variable categorization data 203 comprises various categories of the variables.

The significant variable data 207 comprises information about the one or more significant variables which are determined based on the relationship of the plurality of variables with the energy consumption data. The one or more significant variables identified are further utilized for generating a plurality of clusters.

The cluster formation data 209 comprises information about the plurality of clusters of facilities identified for the multisite enterprise. The plurality of clusters for the multisite enterprise comprises similar set of the variables with similar characteristics.

The actual energy saved data 211 comprises information about the actual energy calculated for each of the facilities of the plurality of sites 103 of the enterprise.

The potential energy saving data 213 comprises data associated with the energy saving potential of the plurality of sites 103 of the enterprise. The potential energy saving data 213 is displayed for the facilities of the plurality of the sites 103 in two formats namely, unadjusted and adjusted saving potential. The unadjusted saving potential is the difference in energy consumption of the plurality of variables with respect to average energy consumption of the respective cluster. The adjusted saving potential is defined as the product of the unadjusted saving potential and the pre-configured value of the enterprise. In an embodiment, the pre-configured value of the enterprise is adjusted based on the feedback received while evaluating the difference between the unadjusted and adjusted saving potentials. The potential energy saving data 213 comprises the adjusted and unadjusted saving potential for each of the facilities of the plurality of sites 103. Further, the potential energy saving data 213 also comprises the adjusted and unadjusted saving potential for the plurality of clusters and for the enterprise as a whole.

The other data 215 may store data, including temporary data and temporary files, generated by modules for performing the various functions of the energy evaluation system 101.

In an embodiment, the one or more data 200 in the memory 109 are processed by the one or more modules 217 of the energy evaluation system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules when configured with the functionality defined in the present disclosure will result in a novel hardware.

In one implementation, the one or more modules 217 may include, for example, a receiving module 219, a variable category identification module 221, a significant variable determination module 223, a cluster identification module 225 a potential energy saving determination module 227 and analysis module 229. FIG. 2b shows an exemplary environment illustrating data flow between different modules of the energy evaluation system 101 in accordance with some embodiment of the present disclosure.

The one or more modules 217 may also comprise other modules 231 to perform various miscellaneous functionalities of the energy evaluation system 101. It will be appreciated that such aforementioned modules may be represented as a single module or a combination of different modules.

The receiving module 219 receives the energy consumption data associated with the plurality of sites 103 of the enterprise. The receiving module 219 also receives the plurality of variables from the data sources 113 of the plurality of sites 103.

The variable category identification module 221 identifies the category for the plurality of variables based on the relationship of the variables with the energy consumption data. The variable category identification module 221 identifies the category for the variables in two stages namely, pre-processing the energy consumption data and the plurality of variables received by the receiving module 219 and performing feature engineering technique on the pre-processed data. In an embodiment, the variable category identification module 221 processes the energy consumption data and the plurality of variables by missing value analysis and outlier analysis. The variable category identification module 221 performs the missing value analysis by discarding one or more sites from the plurality of sites 103 having one or more invalid energy consumption data and the sites which do not have size information. The variable category identification module 221 identifies outliers using a modified Z-score method. In an embodiment, the outliers are referred as abnormalities in the data. The modified Z-score method is a process of standardizing the data to a standard deviation using mean Absolute Deviation (Mean AD) or Median Absolute Deviation (MAD) measures for detecting the outliers. The following equations are used for identifying the outliers:

$$\text{Modified } Z = (xi - \text{MED})/\sigma \qquad 1$$

where, Z: Z-SCORE
xi: Energy consumption data of a facility (example, monthly)
MED: Median of xi $$\text{MAD} = \text{Median}(|xi - \text{MED}|) \qquad 2$$

$$\text{MeanAD} = \text{Average}(|xi - \text{MED}|) \qquad 3$$

Where $\sigma$: standard deviation of energy consumption data of a facility.

If MAD equal to 0, $\sigma = 1.253314 * \text{MeanAD}$
If MAD not equal to 0, $\sigma = 1.486 * \text{MAD}$ In an embodiment, the energy consumption data of a facility represented as xi with the absolute value of modified Z-score exceeding a pre-defined value is considered as an outlier and is discarded from the data set by the variable category identification module 221. The Table 1 below shows an example identifying the outliers using the modified Z-SCORE method.

TABLE 1

| I | Xi | |xi-MED| | Modified Z | Outliers/Not? |
|---|----|---------|-----------|----------------|
| 1 | 34493 | 5651 | 1.05 | Not outlier |
| 2 | 32785 | 3943 | 0.73 | Not outlier |
| 3 | 29017 | 175 | 0.03 | Not outlier |
| 4 | 50067 | 21225 | 3.93 | Outlier |
| 5 | 23827 | 5015 | −0.93 | Not outlier |
| 6 | 23772 | 5070 | −0.94 | Not outlier |
| 7 | 21682 | 7160 | −1.32 | Not outlier |
| 8 | 25512 | 3330 | −0.62 | Not outlier |
| 9 | 26067 | 2775 | −0.51 | Not outlier |
| 10 | 28667 | 175 | −0.03 | Not outlier |
| 11 | 29589 | 747 | 0.14 | Not outlier |

TABLE 1-continued

| I | Xi | |xi-MED| | Modified Z | Outliers/Not? |
|---|----|---------|-----------|----------------|
| 12 | 31660 | 2818 | 0.52 | Not outlier |
| 13 | 8059 | 20783 | −3.85 | Outlier |
| 14 | 30016 | 1174 | 0.22 | Not outlier |

Where the MED of xi is =38842
MAD=3636
Mean AD (mean of absolute deviation from median)= 5717
And $\sigma$=5404

Further, the variable category identification module 221 performs feature engineering technique on the processed data. Feature engineering is a technique carried out to extract maximum and meaningful information from the existing data. Feature engineering is carried out to generate new variables and categories of the variables which exhibit significant relationship with the energy consumption data. The variable category identification module 221 carries out the process of feature engineering in four steps namely, creating new variables, creating ratios and proportions, creating categories of the variables and assigning data type/measurement type. In addition to these four steps, the variable category identification module 221 modifies one or more variables which are predicted to be insignificant by the significant variable determination module 223, by receiving a feedback from the significant variable determination module 223. The variable categorization module 221 creates one or more new variables by applying mathematical computations and creates binomial categorical variables from the existing data. For example, creating annualized energy consumption of a facility per unit area (SQFT). Further, the variable category identification module 221 creates ratios and proportions for the processed energy consumption data and plurality of variables which are numerical. For example, creating ratio of energy consumption of a facility by unit area (SQFT). Further, categories of the plurality of variables are created based on the frequency distribution. The variable category identification module 221 creates a series of interval for the plurality of variables, where the intervals are created upon the selection of the desired number of range by the users. For example, creating a range for the size of the area of plurality of sites like area (5000-10000 SQRT, 10000-15000), creating a range for the age of the facility like, age (0-10 years, 10-15 years). Further, the variable category identification module 221 assigns the plurality of variables with a specific data type/measurement type for example, nominal/ordinal/binary based on the plurality of variables. For example, area of a facility may be assigned as two types as following:
Nominal type: 5000-10000 SQFT, 10000-15000 SQFT
Ordinal type: large, medium, small facility.

Another example for assigning data types for the controls present in the facility is shown below:
Nominal type: type of controls used: type: 1, 2, 3, 4
Binary type: type: 1: Yes/No, type 2: Yes/No.

Further, the variable category identification module 221 modifies one or more insignificant variables based on the feedback received by the significant variable determination module 223. In an embodiment, the modification to the one or more insignificant variables is done by converting the variable categories to numeric values. For example, age of the facility: 0-10 years to 8 years. In an embodiment, the modification to the one or more insignificant variables is done by modifying the number of the categories/ranges of the plurality of variable. For example, modifying the area of a site (5000-10000 SQRT, 10000-15000 SQRT) to 4/5 range. Further, the variable category identification module 221 also receives feedbacks from the cluster identification module 225 for any changes to the categories or measurement type of the plurality of variables based on the cluster evaluation. In an embodiment, the variable category identification module 221 carries out the modification by converting the variable categories to numeric values, by re-assigning variables with specific data type/measurement type. For example, the measurement type of the area of a facility of the site is converted from nominal to ordinal/numeric. The categories created by the variable category identification module 221 are further stored in the database 106.

The significant variable determination module 223 determines one or more significant variables which has an impact on the energy consumption data. The significant variable determination module 223 determines the significant variables by performing three steps namely bivariate analysis, hypothesis testing and determining the significant variables. The bivariate analysis is a simultaneous analysis of two variables. The significant variable determination module 223 performs the bivariate analysis to identify the associations and disassociations between the plurality of variables of any measurement/data type at a pre-defined significance level. In an embodiment, the pre-defined significance level is set based on the business context. For example, the value of pre-defined significance level may be 10%, 7.5%, 5%, 2.5%, 1% or 0.5% based on the enterprise. In an embodiment, the significant variable determination module 223 performs bivariate analysis using linear regression and anova method. A person skilled in the art would understand that any other method can be used for performing the bivariate analysis. In an embodiment, the linear regression and anova methods are inbuilt in the significant variable determination module 223. The linear regression is used to identify the numeric variables exhibiting the significant relationship with the energy consumption data and the anova method is used to identify the categorical variables exhibiting significant relationship with the energy consumption data. Further, the significant variable determination module 223 performs hypothesis testing. The hypothesis testing is a statistical inference method which determines whether a given hypothesis is true or not. The hypothesis testing is carried out by performing two steps namely, stating null and alternate hypothesis and calculating P-value. The first step in the hypothesis test is to specify the null hypothesis (H0). In an embodiment, the null hypothesis (H0) represents that there is no difference between the means i.e. energy consumption data of the plurality of variable. The alternate hypothesis is the negation of the null hypothesis (H1). In an embodiment, H1 represents that there is a difference between the means i.e. energy consumption data of the variable i.e. area categories. The second step in the hypothesis testing is the calculation of the P-value. The significant variable determination module 223 displays the P-value as the outcome of the bivariate analysis. The P-value is the probability value which is used by the significant variable determination module 223 in determining whether the association between the variables and the energy consumption is significant or not. In an embodiment, if the P-value is low, then H0 is rejected indicating a higher probability of significant relationship between the variables and the energy consumption. The threshold values for low/high P-value is computed based on the pre-configured significance level. In an embodiment, if the pre-defined significance level is initially 5%, then it denotes that if P-value is less than 0.05, then the hypothesis testing is concluded with the presence of significant relationship between the plurality variables and the energy consumption data. Further, if the significance level is 5%, then the threshold for low/high P-value is calculated by the significant variable determination module 223 as, P-value less than 0.05 is low and P-value greater than 0.05 is high. In an embodiment, the P-values may be between ranges of 0-1. The third step in the hypothesis testing is the identification of the significant variables. The significant variable determination module 223 identifies one or more variables which are significant based on the second step and create a dataset with significant energy consumption and variables. The fourth step in the hypothesis testing is the ranking of the significant variables. The significant variables identified in the third step are ranked numerically based on the P-value. In an embodiment, the lower the P-value, the higher is the rank. Ranking of the significant variables is performed for deselecting the variables based on the feedback received from the cluster identification module 225. In an embodiment, variables with a lower rank or variables with the least quality of cluster formation are given preference for de-selection. Table 2 below shows an example of ranking the significant variables. In addition, the significant variable determination module 223 adjusts the pre-defined significance level to a value based on the feedback received from the potential energy saving determination module 227. In an embodiment, the pre-defined significance level is adjusted to the nearest lower level for example, 7.5%, 5%, 2.5%, 1% and 0.5%, if the absolute difference in savings in percentages is not below 5%. Further, the significant variable determination module 223 provides feedback to the variable category identification module 221 for modifying the variables which are insignificant based on the bivariate analysis and hypothesis testing. The modifications are performed in the variable category identification module 221 and the modified variables are again taken in the significant variable determination module 223 for hypothesis testing.

TABLE 2

| Output variable name | Input variable name | P-value | Ranking |
| --- | --- | --- | --- |
| Energy consumption | Operating hours of the facility | 0.00000 | 1 |
| Energy consumption | Weather conditions | 0.00005 | 2 |
| Energy consumption | Controls used | 0.01300 | 3 |

The cluster identification module 225 identifies a plurality of clusters of facilities for the multisite enterprise based on the significant variables determined from the significant variable determination module 223. In an embodiment, the concept of similarity is accomplished by the measurement of the distance i.e. dissimilarity/similarity metric $d_{(i,j)}$. The cluster identification module 225 identifies the plurality of clusters of facilities based on dissimilarity between the plurality of sites 103 whose significant variables and energy consumption data are different. Further, In an embodiment, the cluster identification module 225 uses Gower's coefficient or Gower's distance algorithm to compute dissimilarity d(i,j) since it can handle any data/measurement type for example, numeric, nominal, binary and ordinal even when different types occur in the same set. A person skilled in the art would understand that any other algorithms can be used for calculating the dissimilarity in the plurality of clusters. The identification of the plurality of clusters is explained in FIG. 3a.

Figure 3A:
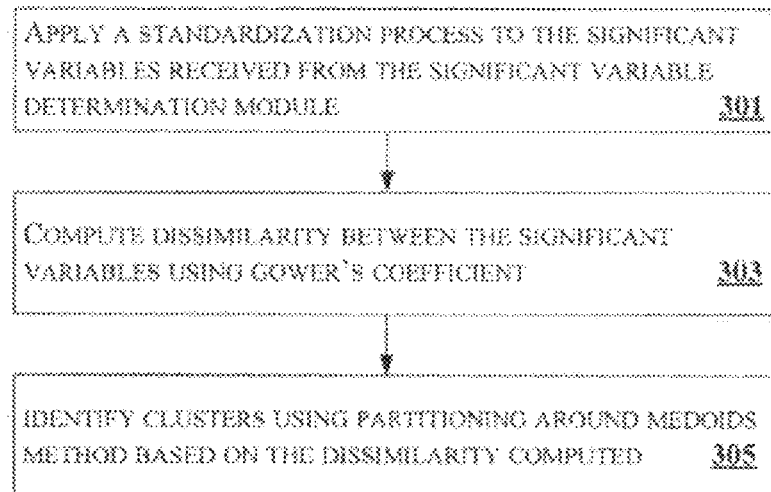
FIG. 3a illustrates a flowchart showing a method for identifying a plurality of clusters of facilities for a multisite enterprise in accordance with some embodiments of present disclosure.

FIG. 3a illustrates a flowchart showing a method for identifying a plurality of clusters for multisite enterprise in accordance with some embodiments of present disclosure.

At block 301, the cluster identification module 225 applies a pre-defined standardization to each of the significant variables received from the significant variable determination module 223 by using range of the corresponding variable, after subtracting the minimum value of the variable. The pre-defined standardization is normalization which scales all the numeric variables in the range [0, 1]. The equation 4 below is provided for standardizing the energy consumption data. Further, the Table 3 shows an example of standardized significant variables calculated using the equation.

$$xstd = \frac{|xi - xmin|}{xrange} \quad 4$$

Where x: Energy Consumption Variable
$x_{std}$: Standardized Energy Consumption Variable
i: Observations/rows in x
$x_{min}$: Minimum Value of Energy Consumption Variable
$x_{max}$: Maximum Value of Energy Consumption Variable
$x_{range}$: xmax−xmin

TABLE 3

| I | Energy consumption variable (x) | Standardized energy consumption variables ($x_{std}$) |
|---|---|---|
| 1 | 34493 | 0.63 |
| 2 | 32785 | 0.59 |
| 3 | 29017 | 0.50 |
| 4 | 50067 | 1.00 |
| 5 | 23827 | 0.38 |
| 6 | 23772 | 0.37 |
| 7 | 21682 | 0.32 |
| 8 | 25512 | 0.42 |
| 9 | 26067 | 0.43 |
| 10 | 28667 | 0.49 |
| 11 | 29589 | 0.51 |
| 12 | 31660 | 0.56 |
| 13 | 8059 | 0.00 |
| 14 | 30016 | 0.52 |

Where, $x_{min}$=8059
$x_{max}$=50067
$x_{rnage}$=42008

At block 303, the cluster identification module 225 computes dissimilarity between plurality of sites 103. The dissimilarity between the plurality of sites 103 is the weighted mean of the contributions of each standardized significant variable. The dissimilarity is computed by the following equations:

$$d(i,j)=\Sigma_{k=1}^{P} w\_k \text{delta}(ij;k)*d(ij,k)/\Sigma_{k=1}^{P} w_k \text{delta}(ij;k) \quad 5$$

where i and j: observation/row in a dataset
p: number of variables
w_k delta(ij; k): weights
w_k: weights[k]; Differential Variable Weights Larger weights can be given to important variables. Cluster Formation module by default uses equal weights for the variables, it has an option to assign differential weights based on the ranking of variable.

delta (ij; k):0 or 1; 0 when the variable x[,k] is missing in either or both rows (i and j) or when the variable is binary and both values are zero and 1 for all other situations.

d(ij,k): k-$^{th}$ variable contribution to the total distance is a distance between x[i,k] and x[j,k]

Nominal or binary variable: d (ij,k) is 0 if both values (i and j) are equal, 1 otherwise Numeric or ordinal: d (ij,k) is absolute difference of both values (i and j), divided by the total range of that variable At block 305, the cluster identification module 225 forms the plurality of clusters for the multisite enterprise based on the output of the dissimilarity computed using Partitioning Around medoids (PAM) method. The PAM algorithm is based on the search for k representative objects or k medoids among the observations of the significant variable dataset. Further, k clusters are constructed by assigning each observation to the nearest medoids. Further, an initial number of clusters are assigned using the thumb rule as:

$$k = \sqrt{\left(\frac{n}{2}\right)}$$

Where k=initial number of clusters
n=number of observation/rows/facilities in the significant variable dataset.

Returning back to FIG. 2a, the cluster identification module 225 also calculates the base number of the clusters (b) and uses (k+10) as the threshold value. The pam-algorithm calculates an average silhouette width s(i) individually for cluster numbers ranging from 2 to (k+10). The average silhouette width s(i) helps in determining the base number of the clusters (b). In an embodiment, cluster number with a large s(i) around 1 indicates a very well cluster formation, a small s(i) around 0 indicates that the variables of the plurality of sites lies between two clusters and an observation with a negative s(i) indicates that the facilities are placed in wrong clusters. The cluster identification module 225 selects the cluster number with the highest average silhouette width s(i) as the base number of the clusters (b). Further, the cluster identification module 225 also evaluates the plurality of clusters for the multisite enterprise as explained in FIG. 3b.

Figure 3B:
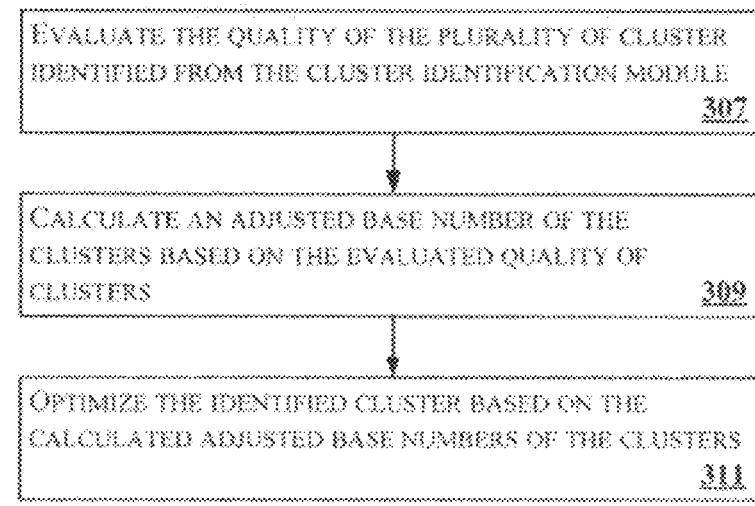
FIG. 3b illustrates a flowchart showing a method for evaluating the plurality of clusters of facilities in accordance with some embodiments of the present disclosure.

FIG. 3b illustrates a flowchart showing a method for evaluating the plurality of clusters for a multisite enterprise in accordance with some embodiments of the present disclosure.

At block 307, the cluster identification module 225 evaluates the quality of the plurality of clusters identified based on a pre-configured value for the plurality of variables in each cluster. The quality of the plurality of clusters is identified by computing in each cluster, number of facilities in each of the variable category. For example, the Table 4 below shows the number of sites having control types A, B, C and D in each clusters identified. In an embodiment, the good quality of clusters is defined such that in each cluster, one category of variable has the highest number of facilities in percentages. For example, 60% and above is configured as the criteria for good quality of clusters. The cluster identification module 225 evaluates the quality of clusters individually for each variable. Further, the base number of the clusters (b) is adjusted in case all the clusters do not satisfy 60% and above quality criteria.

TABLE 4

| Variable | Cluster 1 | Cluster 2 | Cluster 3 | Cluster 4 |
|---|---|---|---|---|
| Control Type A | 13% | 7% | 66% | 8% |
| Control Type B | 9% | 2% | 7% | 75% |

TABLE 4-continued

| Variable | Cluster 1 | Cluster 2 | Cluster 3 | Cluster 4 |
|---|---|---|---|---|
| Control Type C | 8% | 86% | 6% | 5% |
| Control Type D | 70% | 5% | 21% | 11% |

At block 309, the cluster identification module 225 adjusts a base number of clusters ($b_{adj}$) based on the evaluated quality of clusters. The cluster identification module 225 selects three cluster numbers which are greater than the base number of clusters(b) in the order of highest average silhouette width s(i) for the identified clusters in three iterations. Among the three iterations, the cluster numbers having the highest number of clusters satisfying 60% and above quality criteria is being considered as the adjusted base number of clusters ($b_{adj}$).

At block 311, the cluster identification module 225 optimizes the evaluated clusters based on the adjusted base number of clusters ($b_{adj}$). Depending on the calculated adjusted base number of clusters, new set of plurality of clusters are created and the quality of the new clusters is evaluated. In addition to this, variables with the least quality among other variables are identified and provided to the variable category identification module 221 as a feedback for modifying category of one or more variables of the plurality of variables. Further, the significant variable determination module 223 uses the modified variables for testing their significance and creates significant variable dataset. With the significant variable dataset as an input, the cluster identification module 225 evaluates the quality of each variable in the plurality of clusters individually and identifies the variable with the least quality. With the identified least quality variables, the cluster identification module 225 provides feedback to the significant variable determination module 223 for deselecting the variables. The significant variables are again taken as an input for forming optimal plurality of clusters.

Referring back to FIG. 2a, the potential energy savings determination module 227 determines the potential energy savings for the plurality of sites 103 of the enterprise. The potential energy savings determination module 227 determines the potential energy savings by calculating unadjusted and adjusted saving potential for each of the facilities, clusters and enterprise. The unadjusted saving potential is the percentage difference in the energy consumption of each of the facility with respect to the average energy consumption of the respective cluster. Further, based on the cluster membership details in the cluster identification module 225, potential energy savings determination module 227 calculates the average energy consumption of each cluster by the following equation:

$$\text{Average energy consumption of a cluster} = \frac{\text{Total Energy Consumption of facilities in the cluster}}{\text{Total number of facilities in the cluster}} \quad 6$$

Further, the potential energy savings determination module 227 calculates the unadjusted saving potential by computing the percentage differences in energy consumption of each facility. The unadjusted saving potential of a facility is given as:

$$\text{Unadjusted saving potential of a facility in \%} = \frac{\text{Energy consumption of a facility} - \text{Average energy consumption of a cluster}}{\text{Average energy consumption of a cluster}} \quad 7$$

Further, the adjusted savings potential for each facility is computed based on the pre-configured value set initially. In an embodiment, the pre-configured value is configured to 50%. The pre-configured value is a percentage value which gets multiplied with the unadjusted savings potential to get the adjusted saving potential. The adjusted saving potential of a facility is calculated as follow:

$$\text{Adjusted saving potential of a facility in \%} = \text{Unadjusted saving potential of a facility in \%} * \text{Pre configured value in \%} \quad 8$$

The potential energy savings determination module 227 computes the unadjusted and adjusted saving potential for the clusters and enterprise wide. The following equation shows the unadjusted and adjusted saving potentials of a cluster.

$$\text{Unadjusted Saving Potential of a cluster in \%} = \text{Average of unadjusted saving potential of the facilities in that cluster in \%} \quad 9$$

$$\text{Adjusted Saving Potential of a cluster in \%} = \text{Average of Adjusted saving potential of the facilities in that cluster in \%} \quad 10$$

$$\text{Unadjusted Saving Potential of an enterprise in \%} = \text{Average of unadjusted saving potential of the clusters in \%} \quad 11$$

$$\text{Adjusted Saving Potential of an enterprise in \%} = \text{Average of Adjusted saving potential of the clusters in \%} \quad 12$$

In an embodiment, the potential energy saving determination module 227 calculates the actual energy saved for the multisite enterprise. Further, the potential energy saving determination module 227 monitors the pre-configured value and adjusts it based on the feedback received from the analysis module 229 by comparing the unadjusted saving potential given by the potential energy saving determination module 227 with the actual savings realized. Table 5 below shows the pre-configured value adjusted based on the criteria shown.

TABLE 5

| Pre-configured value in % | Absolute difference in savings in % |
|---|---|
| 50% | Above 5% |
| 55% | 4% to 5% |
| 60% | 3% to 4% |
| 65% | 2% to 3% |
| 70% | 1% to 2% |
| 75% | 0% to 1% |

The analysis module 229 analyses the potential energy savings and actual energy saved by calculating absolute difference in savings at each facilities, clusters and enterprise level. The analysis module 229 calculates the absolute difference in savings for each of the facilities by comparing the unadjusted saving potential provided by the potential energy saving determination module 227 with the actual energy saved for each of the facilities using the absolute difference in saving measure. In an embodiment, the absolute difference in saving for a facility is defined as the absolute difference between actual savings and unadjusted saving potentials of a facility in percentage. Further, the analysis module 229 also calculates the absolute difference in savings for each clusters and enterprise. The absolute difference in saving for a cluster is defined as the average of the absolute difference in saving of the facilities in that cluster in percentage. In an embodiment, the absolute difference in savings of an enterprise is defined as the average of absolute differences of savings of the plurality of clusters. Further, the analysis module 229 comprises generating continuous feedbacks for redetermination of the one or more significant variables and optimization of the plurality of clusters upon evaluating actual energy saved and the energy saving potentials for improving the quality of determining the potential energy savings for a multisite enterprise. In an embodiment, the facility with the unadjusted saving potential of above five percentages is considered. Further, the analysis module 229 provides feedback to the significant variable generation module 223 for adjusting the significance level. The analysis module 229 also provides feedback to the potential energy saving determination module 227 for modifying the pre-configured values.

of the plurality of variables on the energy consumption data and the category of the plurality of variables.

At block 407, the energy evaluation system 101 identifies a plurality of clusters for the multisite enterprise based on the one or more significant variables.

At block 409, the energy evaluation system 101 evaluates the plurality of clusters for the multisite enterprise.

At block 411, the energy evaluation system 101 optimizes the plurality of clusters based on the evaluation.

At block 413, the energy evaluation system 101 determines values indicative of potential energy savings for the multiple enterprises based on the evaluation and optimization of the plurality of clusters.

Computing System

Figure 5:
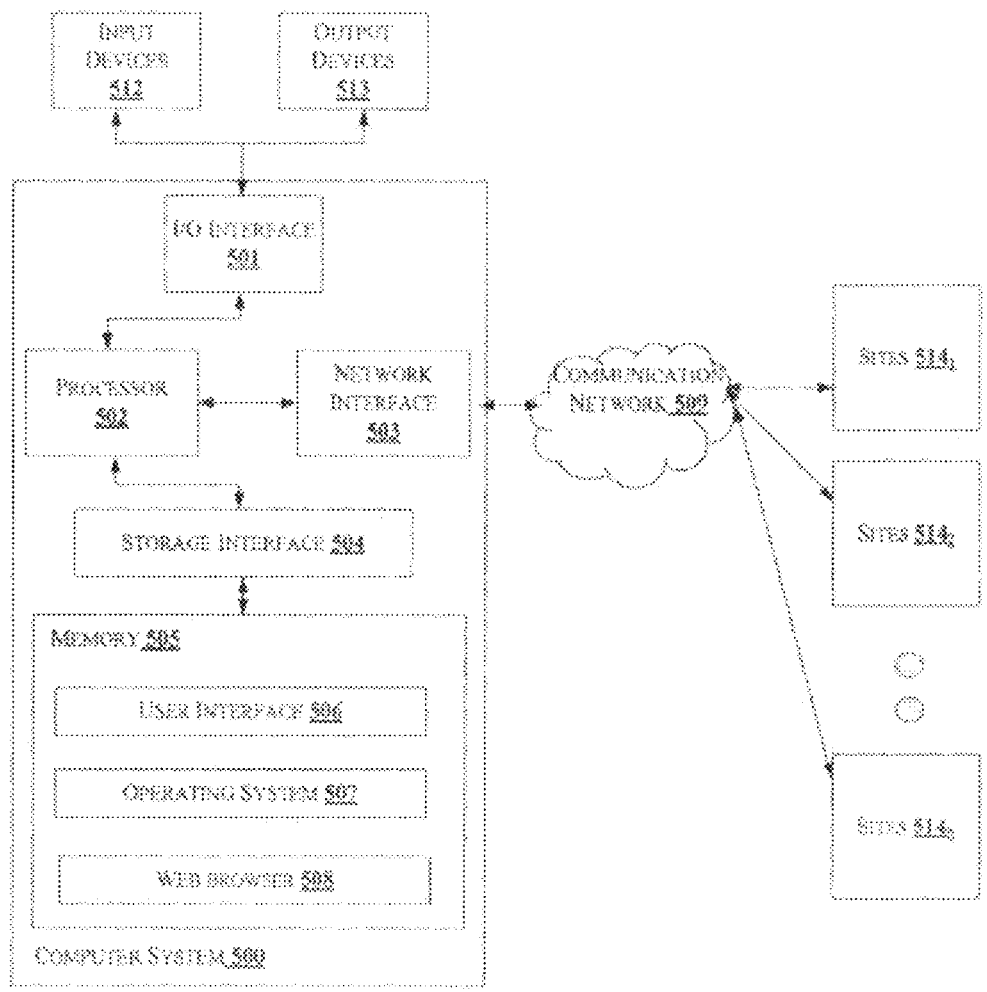
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the energy evaluation system. The computer system 500 may comprise a central processing unit ("CPU" or "processor") 502. The processor 502 may comprise at least one data processor for determin-

TABLE 6

| Facility No. | Total energy consumption of facilities in the clusters | Cluster | Unadjusted saving potential of a facility in % | Adjusted saving potential of a facility | Actual savings | Absolute difference in savings of a facility | Pre-configured value |
|---|---|---|---|---|---|---|---|
| 1 | 373712 | 1 | 13% | 6% | 8% | 4.3% | 55% |
| 2 | 493744 | 1 | 49% | 24% | 26% | 22.8% | 50% |
| 3 | 379655 | 1 | 15% | 7% | 2% | 12.5% | 50% |
| 4 | 365640 | 1 | 10% | 5% | 4% | 6.5% | 50% |
| 5 | 126004 | 1 | −62% | — | — | — | — |
| 6 | 249721 | 1 | −25% | — | — | — | — |
| 7 | 1964150 | 2 | −21% | — | — | — | — |
| 8 | 2164124 | 2 | −13% | — | — | — | — |

Figure 4:
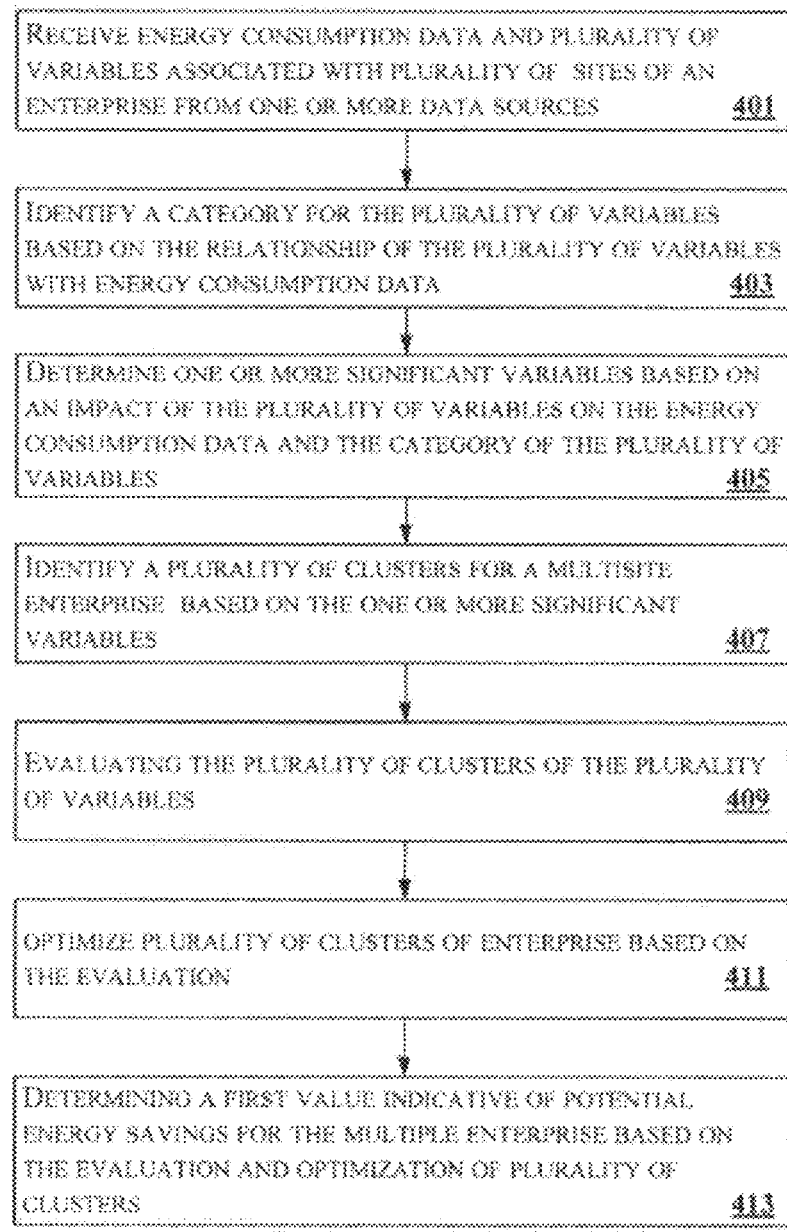
FIG. 4 illustrates a flowchart showing a method for determining potential energy savings for a multisite enterprise in accordance with some embodiments of present disclosure.

FIG. 4 illustrates a flowchart showing a method for determining potential energy savings for a multisite enterprise in accordance with some embodiments of present disclosure.

As illustrated in FIG. 4, the method 400 comprises one or more blocks for determining potential energy savings for a multisite enterprise. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the energy evaluation system 101 receives energy consumption data and plurality of variables associated with the plurality of sites of an enterprise from one or more data sources.

At block 403, the energy evaluation system 101 identifies a category for the plurality of variables based on the relationship of the plurality of variables with energy consumption data.

At block 405, the energy evaluation system 101 determines one or more significant variables based on an impact ing potential energy savings for a multisite enterprise. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of an energy evaluation system. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with the plurality of sites 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 4) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web server 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides a remote non-intrusive and automatic identification of potential energy optimization.

The present disclosure determines the potential energy savings with no limitations on the number and diverse characteristics of the facilities.

An embodiment of the present disclosure brings out season/frequency wise variations in the savings.

An embodiment of the present disclosure handles all the inconsistencies in the energy consumption and variable data by identifying anomalies and arriving at saving potentials without losing accuracy in the data.

An embodiment of the present disclosure provides improved accuracy in the cluster formation which leads to preciseness in the saving potential calculation.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Energy evaluation system |
| 103 | Plurality of sites |
| 103A | In-site instrumentations |
| 105 | Communication network |
| 106 | Database |
| 107 | I/O interface |
| 109 | Memory |
| 111 | Processor |
| 200 | Data |
| 201 | Site energy consumption data |
| 203 | Variable data |
| 205 | Variable categorization data |
| 207 | Significant variable data |
| 209 | Cluster formation data |
| 211 | Actual energy saving data |
| 213 | Potential energy saving data |
| 215 | Other data |
| 217 | Modules |
| 219 | Receiving module |
| 221 | Variable categorization module |
| 223 | Significant variable determination module |
| 225 | Cluster identification module |
| 227 | Potential energy saving determination module |
| 229 | Analysis module |
| 231 | Other modules |

What is claimed is:

1. A method for determining potential energy savings for a multisite enterprise, the method comprising:

receiving, by an energy evaluation system, energy consumption data and plurality of variables, associated with plurality of sites of an enterprise from one or more data sources, the energy consumption data corresponding to energy consumption of equipment operating across the multisite enterprise;

identifying, by the energy evaluation system, a category for the plurality of variables based on a relationship of the plurality of variables with the energy consumption data;

determining, by the energy evaluation system, one or more significant variables based on the impact of the plurality of variables on the energy consumption data and the category of the variables;

identifying, by the energy evaluation system, a plurality of clusters for a multisite enterprise based on the one or more significant variables;

evaluating, by the energy evaluation system, the plurality of clusters for a multisite enterprise;

optimizing, by the energy evaluation system, the evaluated plurality of clusters based on the evaluation;

determining, by the energy evaluation system, values indicative of potential energy savings for the multisite enterprise based on the evaluation and optimization of the plurality of the clusters;

altering operation of at least one equipment operating across the multisite enterprise in response to the potential energy savings.

2. The method as claimed in claim 1, wherein the plurality of variables associated with the plurality of sites of the enterprise comprises size information, weather conditions, operating hours of the sites, type of equipment, age of equipment, operating condition of equipment, instrumentation and controls used at the plurality of sites of the enterprise.

3. The method as claimed in claim 1, wherein identifying the category for the variables comprises:

discarding, by the energy evaluation system, one or more sites from the plurality of sites which have one or more invalid energy consumption data and sites which do not have size information;

generating, by the energy evaluation system, new variables and ratios and proportions, for the plurality of variables;

assigning, by the energy evaluation system, data type or measurement type for the plurality of variables;

and modifying, by the energy evaluation system, the plurality of variables based on the feedback received during identification of significant variables and evaluation of the plurality of clusters.

4. The method as claimed in claim 1, wherein determining the one or more significant variables comprises:

deselecting, by the energy evaluation system, the plurality of variables based on a ranking of the plurality of variables and feedback received during evaluation of the plurality of clusters; and adjusting, by the energy evaluation system, a pre-defined significance level based on a feedback received during evaluation of actual energy saved and the energy saving potential.

5. The method as claimed in claim 1, wherein the plurality of clusters for a multisite enterprise are identified based on dissimilarity between the plurality of sites whose significant variables and energy consumption data are different.

6. The method as claimed in claim 1, wherein evaluating the plurality of clusters of the multisite enterprise comprises:

evaluating, by the energy evaluation system, quality of the plurality of clusters based on a pre-configured value for the plurality of variables in each cluster; and adjusting, by the energy evaluation system, a base number of the plurality of clusters based on the evaluation of the quality of the plurality of clusters.

7. The method as claimed in claim 1, wherein optimizing the plurality of clusters for the multisite enterprise comprises:

creating, by the energy evaluation system, a new set of plurality of clusters based on an adjusted base number of clusters; and providing, by the energy evaluation system, feedback for modifying category for one or more variables of the plurality of variables and for deselecting the variables based on the new set of plurality of clusters.

8. The method as claimed in claim 1, wherein determining the potential energy savings for the multisite enterprise comprises calculating unadjusted and adjusted saving potential for the multisite enterprise.

9. The method as claimed in claim 8, wherein the unadjusted saving potential of a site is the difference in energy consumption of a site with respect to average energy consumption of the respective cluster.

10. The method as claimed in claim 8, wherein the adjusted saving potential is determined based on a pre-configured value of the enterprise and the unadjusted saving potential.

11. The method as claimed in claim 1 further comprising evaluating actual energy saved for the multiple sites of the enterprise and the energy saving potential determined.

12. The method as claimed in claim 1 further comprising generating continuous feedbacks for redetermination of the one or more significant variables and optimization of the plurality of clusters upon evaluating actual energy saved and the energy saving potentials for improving the quality of determining potential energy savings for a multisite enterprise.

13. An energy evaluation system for determining potential energy savings for a multisite enterprise, comprising:

a processor; and a memory communicatively coupled to the processor, wherein the memory stores processor instructions, which, on execution, causes the processor to:

receive energy consumption data and plurality of variables, associated with plurality of sites of an enterprise from one or more data sources, the energy consumption data corresponding to energy consumption of equipment operating across the multisite enterprise;

identify a category for the plurality of variables based on a relationship of the plurality of variables with the energy consumption data;

determine one or more significant variables based on the impact of the plurality of variables on the energy consumption data and the category of the variables;

identify a plurality of clusters for a multisite enterprise based on the one or more significant variables;

evaluate the plurality of clusters for a multisite enterprise;

optimize the evaluated plurality of clusters based on the evaluation;

determine values indicative of potential energy savings for the multisite enterprise based on the evaluation and optimization of the plurality of the clusters;

altering operation of at least one equipment operating across the multisite enterprise in response to the potential energy savings.

14. The energy evaluation system as claimed in claim 13, wherein the plurality of variables associated with the plurality of sites of the enterprise comprises size information, weather conditions, operating hours of the sites, type of equipment, age of equipment, operating condition of equipment, instrumentation and controls used at the plurality of sites of the enterprise.

15. The energy evaluation system as claimed in claim 13, wherein to identify he category for the variables the instruction causes the processor to:

discard one or more sites from the plurality of sites which have one or more invalid energy consumption data and sites which do not have size information;

generate new variables and ratios and proportions, for the plurality of variables;

assign data type or measurement type for the plurality of variables; and modify the plurality of variables based on the feedback received during identification of significant variables and evaluation of the plurality of clusters.

16. The energy evaluation system as claimed in claim 13, wherein to determine the one or more significant variables the instruction causes the processor to:

deselect the plurality of variables based on a ranking of the plurality of variables and feedback received during evaluation of the plurality of clusters; and adjust a pre-defined significance level based on a feedback received during evaluation of actual energy saved and the energy saving potential.

17. The energy evaluation system as claimed in claim 13, wherein the processor identifies the plurality of clusters for a multisite enterprise based on dissimilarity between the plurality of sites whose significant variables and energy consumption data are different.

18. The energy evaluation system as claimed in claim 13, wherein to evaluate the plurality of clusters of the multisite enterprise the instruction causes the processor to:

evaluate quality of the plurality of clusters based on a pre-configured value for the plurality of variables in each cluster; and adjust a base number of the plurality of clusters based on the evaluation of the quality of the plurality of clusters.

19. The energy evaluation system as claimed in claim 13, wherein to optimize the plurality of clusters for the multisite enterprise the instruction causes the processor to:

create a new set of plurality of clusters based on an adjusted base number of clusters; and provide feedback for modifying category for one or more variables of the plurality of variables and for deselecting the variables based on the new set of plurality of clusters.

20. The energy evaluation system as claimed in claim 13, wherein the instruction causes the processor to determine the potential energy savings for the multisite enterprise by calculating unadjusted and adjusted saving potential for the multisite enterprise.

21. The energy evaluation system as claimed in claim 20, wherein the unadjusted saving potential of a site is the difference in energy consumption of a site with respect to average energy consumption of the respective cluster.

22. The energy evaluation system as claimed in claim 20, wherein the instruction causes the processor to determine the adjusted saving potential based on a pre-configured value of the enterprise and the unadjusted saving potential.

23. The energy evaluation system as claimed in claim 13, wherein the instruction causes the processor to evaluate actual energy saved for the multiple sites of the enterprise and the energy saving potential determined.

24. The energy evaluation system as claimed in claim 13, wherein the instruction causes the processor to generate continuous feedbacks for redetermination of the one or more significant variables and optimization of the plurality of clusters upon evaluating actual energy saved and the energy saving potentials for improving the quality of determining potential energy savings for a multisite enterprise.

25. A non-transitory computer readable medium including instruction stored thereon that when processed by at least one processor cause an energy evaluation system to perform operation comprising:

receiving energy consumption data and plurality of variables, associated with plurality of sites of an enterprise from one or more data sources, the energy consumption data corresponding to energy consumption of equipment operating across the multisite enterprise;

identifying a category for the plurality of variables based on a relationship of the plurality of variables with the energy consumption data;

determining one or more significant variables based on the impact of the plurality of variables on the energy consumption data and the category of the variables;

identifying a plurality of clusters for a multisite enterprise based on the one or more significant variables;

evaluating the plurality of clusters for a multisite enterprise;

optimizing the evaluated plurality of clusters based on the evaluation;

determining values indicative of potential energy savings for the multisite enterprise based on the evaluation and optimization of the plurality of the clusters;

altering operation of at least one equipment operating across the multisite enterprise in response to the potential energy savings.

* * * * *